(12) United States Patent
Farran et al.

(10) Patent No.: US 7,713,603 B2
(45) Date of Patent: May 11, 2010

(54) MOLDED ARTICLE METHOD, AND APPARATUS FOR PROVIDING AN UNDERCUT MOLDING FEATURE IN A MOLD TOOL

(75) Inventors: Ahmad Farran, Windsor (CA); Karim Amellal, Tecumseh (CA); Ryan Beebe, Clawson, MI (US); Jeanne Schairer, Clarkston, MI (US)

(73) Assignee: Vitec, LLC, Detroit, MI (US)

( * ) Notice: Subject to any disclaimer, the term of this patent is extended or adjusted under 35 U.S.C. 154(b) by 325 days.

(21) Appl. No.: 11/504,168

(22) Filed: Aug. 15, 2006

(65) Prior Publication Data

US 2007/0098935 A1 May 3, 2007

Related U.S. Application Data

(60) Provisional application No. 60/731,337, filed on Oct. 28, 2005.

(51) Int. Cl.
  B29D 22/00 (2006.01)
  B32B 3/00 (2006.01)
  B32B 27/00 (2006.01)
  B32B 27/08 (2006.01)

(52) U.S. Cl. .................... 428/35.7; 137/15.17; 137/587; 249/117; 249/142; 249/144; 249/150; 249/183; 249/186; 428/34.1

(58) Field of Classification Search ................ 428/35.7, 428/35.1; 137/587, 15.17; 249/117, 142, 249/144, 150, 183, 186
  See application file for complete search history.

(56) References Cited

U.S. PATENT DOCUMENTS 3,743,236 A 7/1973 Schwenk et al.

(Continued)

FOREIGN PATENT DOCUMENTS

DE 3303913 9/1983

(Continued)

*Primary Examiner*—Brent T O'Hern
(74) *Attorney, Agent, or Firm*—Honigman Miller Schwartz and Cohn LLP

(57) ABSTRACT

A molded article is disclosed. According to an embodiment, the molded article includes a blow-molded parison of material having an undercut formed in a surface of the parison of material. An apparatus for providing an undercut molding feature in a mold tool is also disclosed. According to an embodiment, the apparatus includes one or more undercut forming surfaces and an actuator pin that causes the one or more undercut forming surfaces to move to/from an undercut molding position or an undercut de-molding position. A method for providing an undercut molding feature in a mold tool is also disclosed. According to an embodiment, the method includes the step of moving an actuator to a position of engagement with one or more undercut forming surfaces to cause movement of the one or more undercut forming surfaces to/from an undercut molding position and an undercut de-molding position. A method for molding a molded article is also disclosed. According to an embodiment, the method includes the steps of moving an actuator to a first position of engagement with one or more undercut forming surfaces to cause movement of said one or more undercut forming surfaces to an undercut molding position proximate a surface in a mold tool cavity, providing material into the mold tool cavity, molding the material to conform to the one or more undercut forming surfaces and surface of the mold tool cavity, and moving said actuator to a second position of engagement with said one or more undercut forming surfaces to cause movement of said one or more undercut forming surfaces to a de-molding position proximate said surface in said mold tool cavity.

5 Claims, 18 Drawing Sheets

U.S. PATENT DOCUMENTS

| | | | |
|---|---|---|---|
| 4,101,256 | A | 7/1978 | White et al. |
| 4,130,264 | A | 12/1978 | Schroer et al. |
| 4,767,312 | A | 8/1988 | Huttner et al. |
| 5,842,648 | A | 12/1998 | Havlovitz et al. |
| 6,193,492 | B1 | 2/2001 | Lagnier et al. |
| 6,454,554 | B1 | 9/2002 | Lopez et al. |
| 6,514,068 | B2 | 2/2003 | Dohmen et al. |
| 6,726,871 | B2 | 4/2004 | Kehoe et al. |
| 2002/0000252 | A1* | 1/2002 | Rosseel ............... 137/587 |
| 2005/0217401 | A1 | 10/2005 | Osterlanger et al. |

FOREIGN PATENT DOCUMENTS

| | | |
|---|---|---|
| DE | 3721690 | 7/1987 |
| EP | 0595491 | 5/1994 |
| EP | 1129964 | 9/2001 |
| EP | 1147934 | 10/2001 |
| GB | 2162116 | 1/1986 |
| JP | 57075809 | 5/1982 |
| JP | 59022713 | 2/1984 |
| JP | 59087112 | 5/1984 |
| JP | 60250930 | 12/1985 |
| JP | 62257826 | 11/1987 |
| JP | 06023726 | 2/1994 |
| JP | 07266384 | 10/1995 |
| JP | 08183038 | 7/1996 |
| JP | 08244050 | 9/1996 |
| JP | 10071634 | 3/1998 |
| JP | 10296874 | 11/1998 |
| JP | 11077698 | 3/1999 |
| JP | 11333891 | 12/1999 |

* cited by examiner

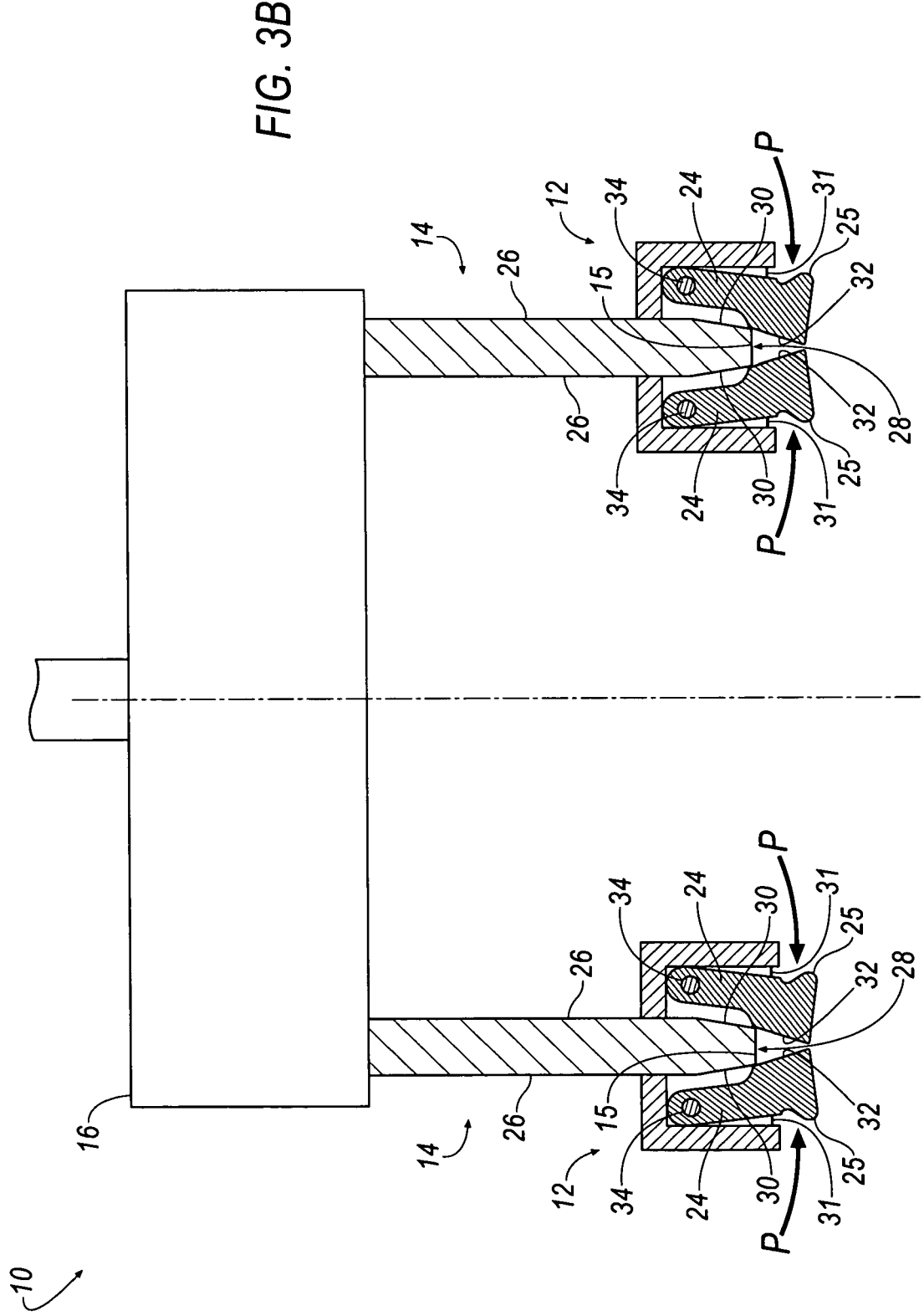

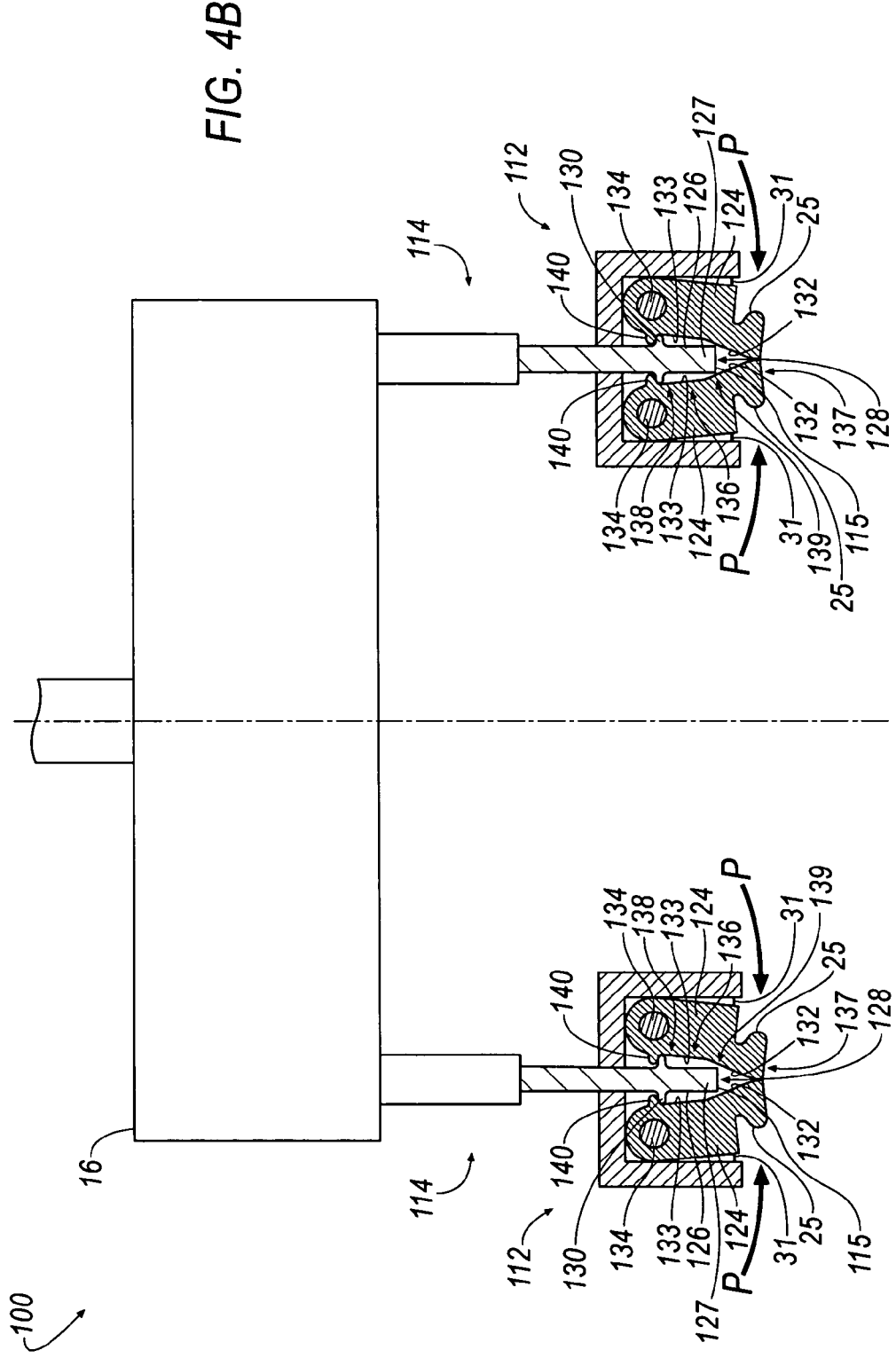

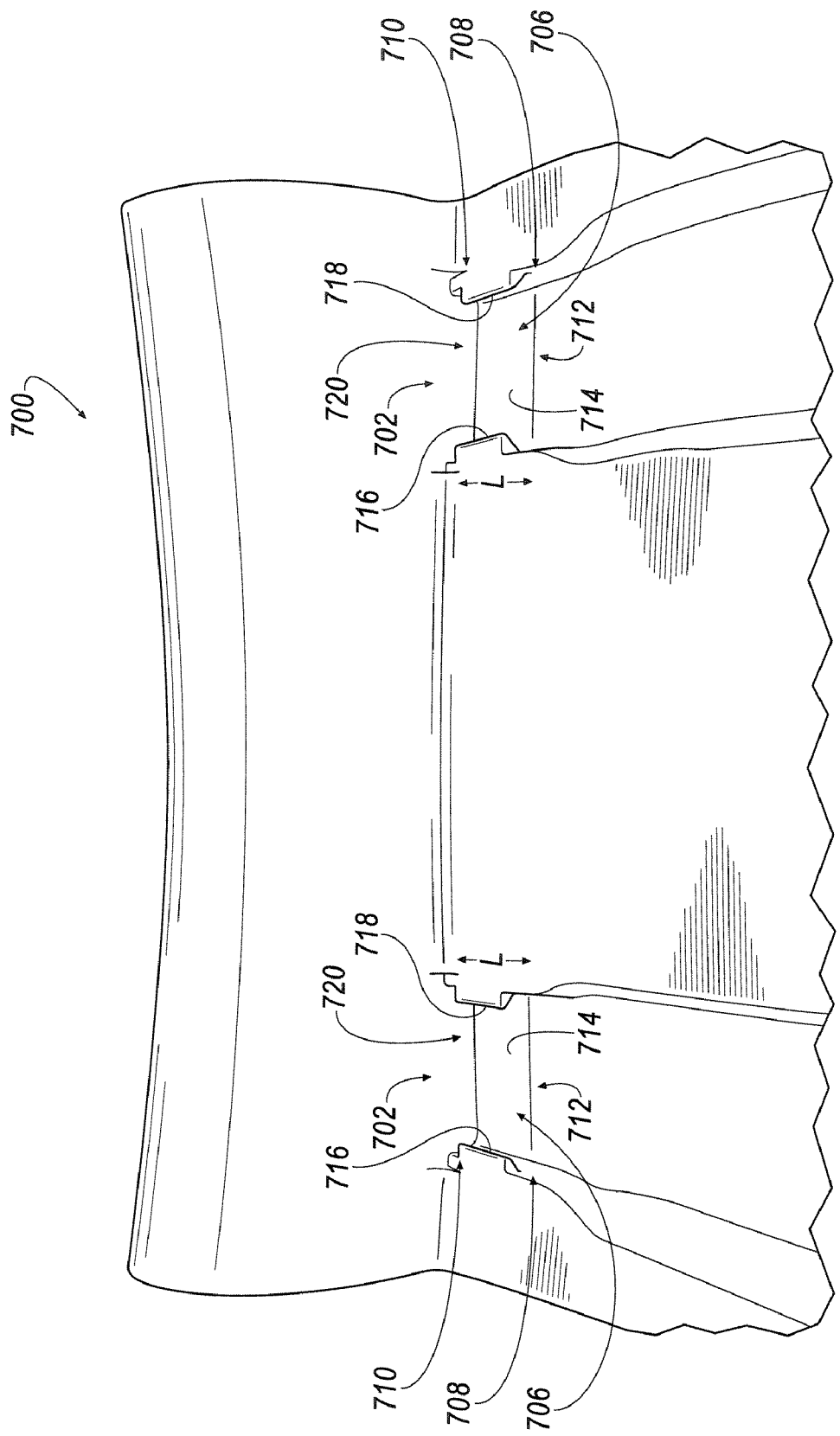

MOLDED ARTICLE METHOD, AND APPARATUS FOR PROVIDING AN UNDERCUT MOLDING FEATURE IN A MOLD TOOL

RELATED APPLICATION

This disclosure claims the benefit of Provisional Patent Application No. 60/731,337, filed on Oct. 28, 2005.

FIELD OF THE INVENTION

The disclosure relates to a molded article, method, and apparatus for providing an undercut mold feature in a mold tool.

DESCRIPTION OF THE RELATED ART

It is known in the art that articles may be mechanically-coupled with a male portion (e.g., a "dovetail") and a female portion (e.g., an undercut or "dovetail groove"). When forming, for example, a plastic article including an undercut or dovetail groove by way of a mold tool, at least a portion of a cavity of the mold tool may include the compliment of the shape of a corresponding dovetail to be inserted into the undercut or dovetail groove formed in the plastic article.

Accordingly, the molding of an article including an undercut may introduce inherent difficulty in the de-molding of the article from the corresponding dovetail-shaped molding feature of the mold tool cavity. A known apparatus including a dovetail-shaped molding feature for de-molding an article from a mold tool is shown, for example, in U.S. Pat. No. 3,743,236 to Schwenk et al. The mold tool in U.S. Pat. No. 3,743,236 is an injection molding mold tool.

Referring to FIG. 12A, plastic material is first injected into a mold tool cavity geometry defined by a pair of mold halves. Some of the mold tool cavity geometry may be defined by a dovetail-profiled member extending from one of the mold halves. As seen in FIG. 12B, the injected plastic material encompasses the deformable dovetail-profiled member. Referring to FIG. 12C, once a plastic article is formed as a result of the plastic material filling and subsequently hardening within the mold tool cavity geometry, the plastic article is de-molded from the mold halves as the deformable member is elastically-withdrawn from the plastic part. As seen in FIG. 12D, the deformable member is cleared from the plastic article to form an undercut in the plastic part.

Although the method and apparatus shown in FIGS. 12A-12D illustrates a known method and apparatus that forms an undercut in an article by way of an injection molding mold tool, the method may have several disadvantages. For example, the deformable member may be undesirably dislodged or sheared from the mold half and become wedged in the plastic article. Additionally, depending on the thickness of the plastic article and the width of the deformable member, an undesirable stress may be imparted to the undercut during the de-molding operation (see, e.g., FIG. 12C), which may result in the destruction of the mechanical-coupling capabilities of the plastic article proximate the undercut.

Unlike the injection molding process shown in FIGS. 12A-12D, the blow molding of plastic articles is far more complex and challenging in terms of process control. Typically, the thickness of a plastic article in an injection molding operation is not an issue since the thickness of the plastic article is dictated by a defined, closed geometrical configuration of mold halves of the mold tool (see, e.g., FIG. 12A). Conversely, the thickness of an article during a blow molding operation is dependent upon a programmed extrusion of a parison of molten plastic, the timing of the opening/closing of a core piece, swell and sag/gravity effect of the parison, a pre-blowing of the parison, a closing of mold halves, and a final inflation of the parison. As such, the introduction of complex features in a plastic article, such as undercuts, may increase the difficulty in maintaining a uniform thickness during the blow molding and subsequent de-molding operation of the plastic article from a blow molding tool.

In addition to maintaining the thickness integrity of a plastic article proximate, for example, an undercut, it is also desirable to meet emission standards and regulations of molded plastic articles. For example, if the molded plastic article is a fuel tank and includes an undercut, for example, an inconsistent thickness of the fuel tank may cause the tank to fail emission standards and regulations. Specifically, in a multi-layer fuel tank, it may be difficult to maintain the integrity of an emission barrier layer proximate an undercut. As a result, emissions may undesirably escape the fuel tank proximate an undercut having an inconsistent thickness.

Accordingly, a need therefore exists for improved molded articles, a method, and apparatus for molding plastic articles including an undercut.

SUMMARY OF THE INVENTION

A molded article is disclosed. According to an embodiment, the molded article includes a blow-molded parison of material having an undercut formed in a surface of the parison of material.

An apparatus for providing an undercut molding feature in a mold tool is also disclosed. According to an embodiment, the apparatus includes one or more undercut forming members and an actuator pin that causes the one or more undercut forming members to move to/from an undercut molding position or an undercut de-molding position.

A method for providing an undercut molding feature in a mold tool is also disclosed. According to an embodiment, the method includes the step of moving an actuator to a position of engagement with one or more undercut forming members to cause movement of the one or more undercut forming members to/from an undercut molding position and an undercut de-molding position.

A method for molding a molded article is also disclosed. According to an embodiment, the method includes the steps of moving an actuator to a first position of engagement with one or more undercut forming members to cause movement of said one or more undercut forming members to an undercut molding position proximate a surface in a mold tool cavity, providing material into the mold tool cavity, molding the material to conform to the one or more undercut forming members and surface of the mold tool cavity, and moving said actuator to a second position of engagement with said one or more undercut forming members to cause movement of said one or more undercut forming members to a de-molding position proximate said surface in said mold tool cavity.

BRIEF DESCRIPTION OF THE DRAWINGS

Embodiments of the disclosure will now be described, by way of example, with reference to the accompanying drawings, wherein:

FIGS. 3A-3B are cross-sectional views according line III-III of FIG. 1 of an apparatus for forming an undercut in a mold tool according to an embodiment;

FIGS. 4A-4B are cross-sectional views according line IV-IV of FIG. 1 of an apparatus for forming an undercut in a mold tool according to an embodiment;

FIG. 8 is a partial perspective view of a molded article including an undercut according to an embodiment;

DETAILED DESCRIPTION OF THE INVENTION

Figure 1:
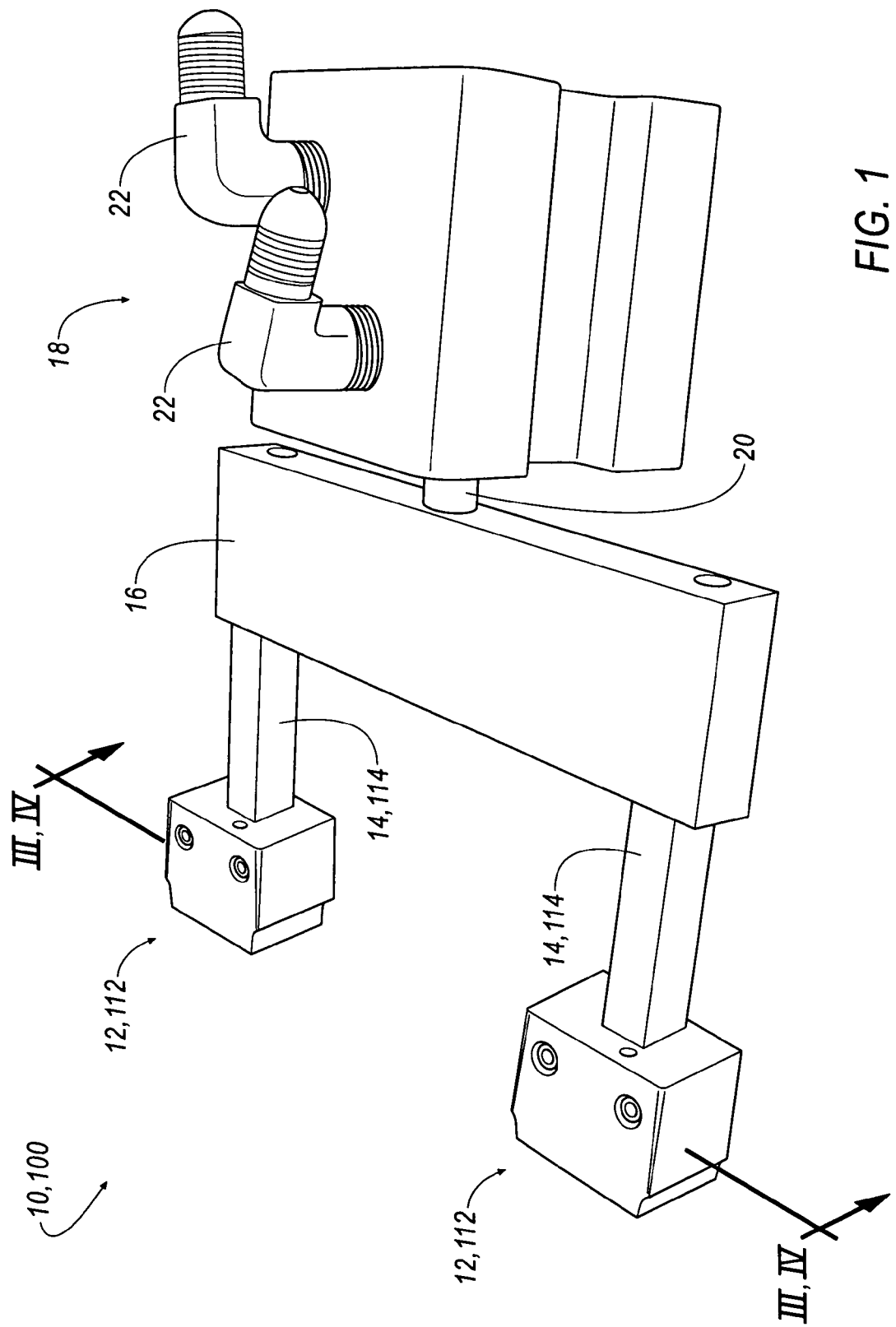
FIG. 1 is a perspective view of an apparatus for forming an undercut in a mold tool according to an embodiment.

Referring now to the drawings, the illustrative embodiments of the present disclosure are shown in detail. Although the drawings represent some embodiments of the present disclosure, the drawings are not necessarily to scale and certain features may be exaggerated to better illustrate and explain the present disclosure. Further, the embodiments set forth herein are not intended to be exhaustive or otherwise limit or restrict the disclosure to the precise forms and configurations shown in the drawings and disclosure in the following detailed description.

Referring to FIGS. 1-4B, an apparatus for providing an undercut molding feature in a mold tool is shown generally at 10, 100 according to an embodiment. It will be appreciated that the apparatus 10, 100 may be included, or, incorporated with any desirable mold tool, such as, for example, a blow molding mold tool, an injection molding mold tool, or the like. According to an embodiment, the apparatus 10, 100 is included with a blow molding tool 500 (FIGS. 5-7D). Accordingly, the blow molding tool 500 may form a molded article, such as, for example, a fuel tank 700 (FIGS. 7C-8 and 10-11) including an undercut 702 that may be mechanically-coupled to an apparatus 900 (FIGS. 9-11) by way of a dovetail 902 extending from the apparatus 900 that is inserted into the undercut 702. The undercut 702 of the mechanical-coupling may also be referred to as a female portion and the dovetail 902 of the mechanical-coupling may also be referred to as a male portion.

Referring now to FIGS. 1-3B, the apparatus 10 is shown and discussed according to an embodiment. As seen in FIG. 1, the apparatus 10 includes one or more undercut molding devices 12 that respectively receive an actuator pin 14. The actuator pin 14 may extend from a coupling block 16 that is driven by an actuator 18. The actuator 18 may include, for example, a shaft 20 that is coupled to the coupling block 16. The actuator 18 may also include coupling members 22 that receive, for example, electricity, a fluid (e.g., compressed air, hydraulic medium), or the like to operate the actuator 18. It will be appreciated that if only one undercut molding device 12 is included in the design of the apparatus 10, the actuator pin 14 may extend directly from the actuator 18 for engagement with the undercut molding device 12, thereby obviating the coupling block 16 and shaft 20.

Figure 2:
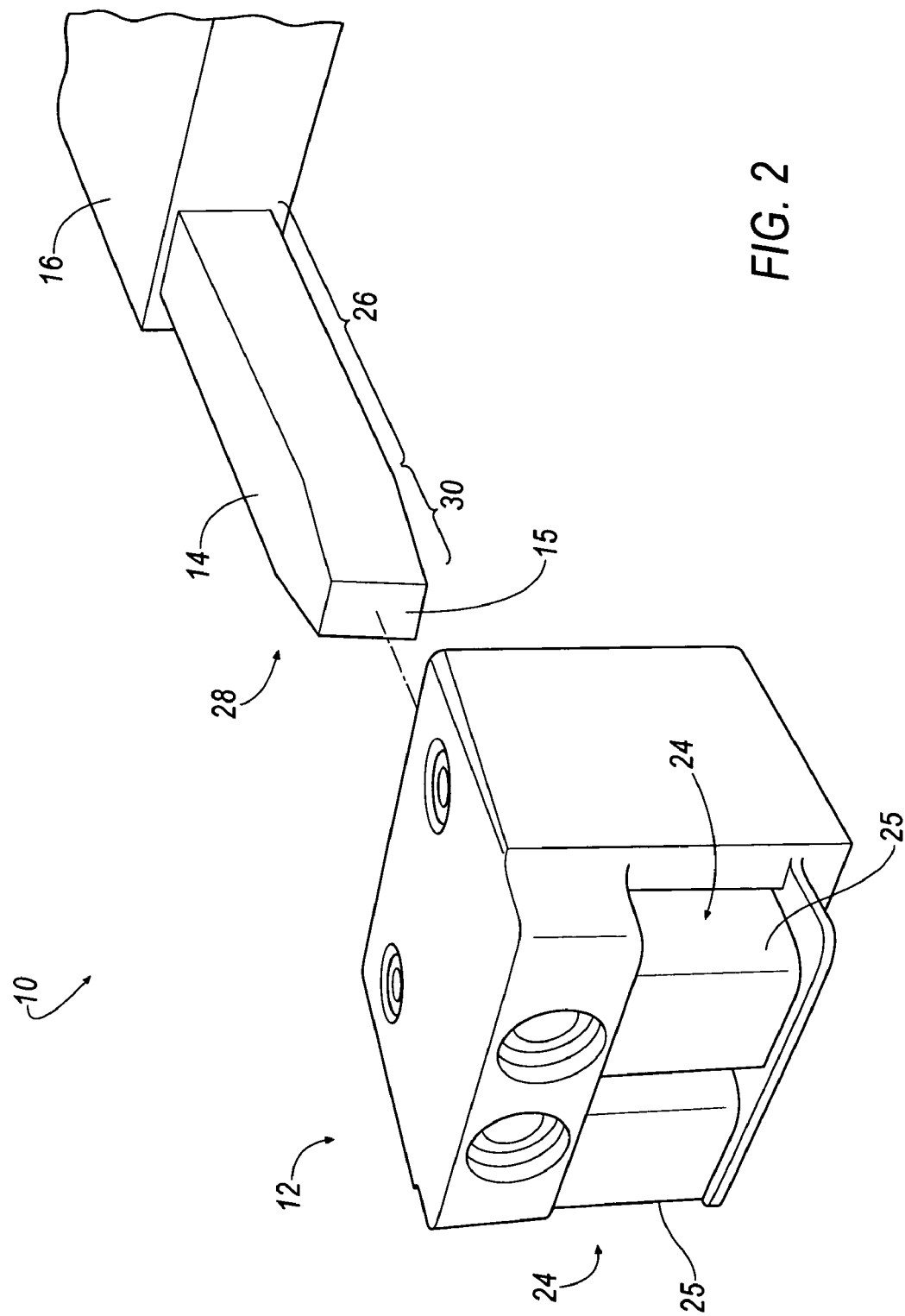
FIG. 2 is a perspective, disassembled view of the apparatus of FIG. 1 for forming an undercut in a mold tool according to an embodiment.
Figure 3A:
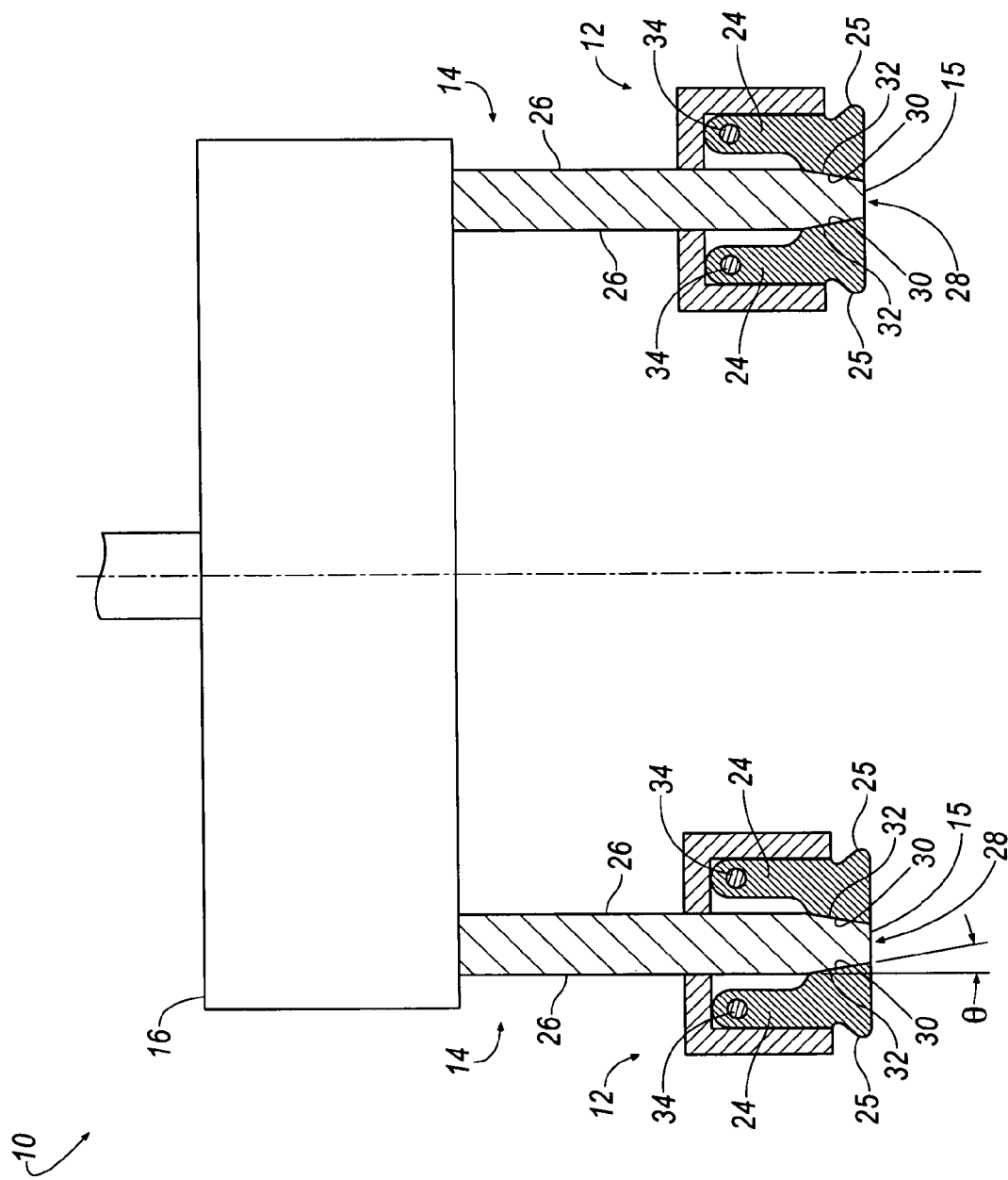

Referring to FIG. 2, the undercut molding device 12 is shown separated from the actuator pin 14. The undercut molding device 12 may include at least one pivotable arm 24 having an undercut forming surface 25. As illustrated in FIGS. 3A and 3B, each undercut forming surface 25 a shaped resembling a half-dovetail or foot, however, it will be appreciated that the undercut forming surface 25 is not limited to the illustrated cross-sectional geometry of a half-dovetail or foot and may include any desirable shape, geometry, or configuration.

According to the illustrated embodiment, the undercut molding device 12 may include two pivotable arms 24 that may be symmetrically-shaped and disposed in the undercut molding device 12. However, it will be appreciated that if two pivotable arms 24 are included in the undercut molding device 12, a pair of pivotable arms 24 is not limited to the illustrated symmetrical shape and/or disposition in the molding device 12 and that a pair of pivotable arms 24 may be disposed in the undercut molding device 12 in a non-symmetrical fashion.

As seen in FIGS. 2-3B, the actuator pin 14 includes substantially straight, parallel edges 26 that taper inwardly at an arm-engaging end 28 to define tapered edges 30. An angle, $\theta$ (FIG. 3A), is formed at the arm-engaging end 28 by the substantially straight, parallel edge 26 and the tapered edge 30. The angle, $\theta$, may approximately range, for example, between about 5-15°, according to an embodiment. Additionally, the actuator pin 14 may also include an undercut-forming surface 15 that, when positioned as shown in FIG. 3A with the undercut forming surfaces 25, forms part of an undercut profile 702 for a molded article 700.

The arm-engaging end 28 of the actuator pin 14 provides a position of engagement with the pivotable arms 24. That is, the actuator pin 14 may, or may not, engage the pivotable arms 24 depending on the state of the actuator 18. For example, as seen in FIG. 3A, actuator 18 may be activated in a first state to cause the actuator pin 14 to move to a deployed, extended position so that the arm-engaging end 28 substantially contacts at least most of an edge 32 of each pivotable arm 24; accordingly, when the arm-engaging end 28 contacts the edge 32 of each pivotable arm 24, the pivotable arms 24 are pivotably-moved about a pivot 34, into an undercut molding position (i.e. an expanded position).

Conversely, as seen in FIG. 3B, actuator 18 may be activated in a second state thereby causing the actuator pin 14 to move to a retracted position so that the arm-engaging end 28 provides little or no contact with the edge 32 of each pivotable arm 24. The pivotable arms 24 may be pivotally urged in the direction of the arrow, P, in order to permit the apparatus 10 to move from the undercut molding position (i.e., as seen in FIG. 3A) to the undercut de-molding position (i.e., as seen in FIG. 3B). This urging can be effected by way of a bias means (e.g. a spring 31 or the like attached to pivotable arms 24), or, it may be accomplished by separating mold halves of a mold tool away from an article that is molded about the undercut forming surfaces 25 thereby causing the frictional engagement between the undercut forming surfaces 25 of the pivotable arms 24 and the molded article 700 to pivot the pivotable arms 24 into a retracted position. Accordingly, when the arm-engaging end 28 provides less or no contact with the edge 32 of each pivotable arm 24, the pivotable arms 24 are free to pivot about the pivot 34 from the undercut molding position to an undercut de-molding position.

Figure 4A:
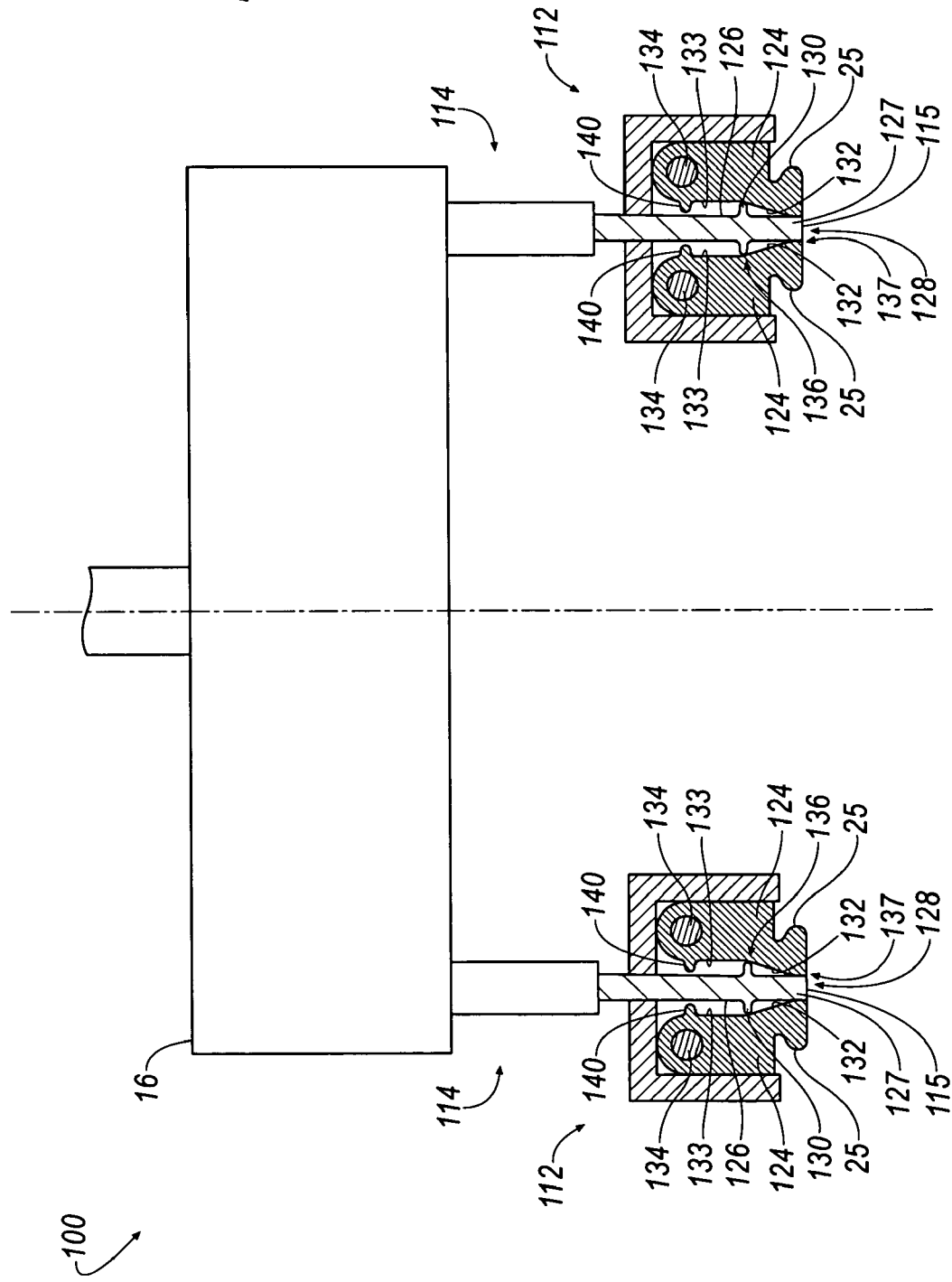

Referring now to FIGS. 1 and 4A, 4B, an apparatus for providing an undercut molding feature in a mold tool is shown generally at 100 according to an embodiment. The apparatus 100 includes one or more undercut molding devices 112, actuator pins 114, and at least one pivotable arm 124. In comparison to the apparatus 10, the actuator pins 114 do not include edges that taper to form an arm-engaging end; rather, the actuator pin 114 includes substantially straight, parallel edges 126 with a radial portion 130 such as, for example, an annulus or radial projections/nibs. Conversely, the pivotable arms 124 include a tapered edge 132, a straight edge 133, and a projection/nib 140. The arm-engaging end 128 of the actuator pin 114 includes a plunger portion 127 that contacts the tapered edge 132 of the pivotable arm 124, and, the radial portion 130 of the actuator pin 114 contacts the straight edge 133 of the pivotable arm 124.

In operation, the actuator 18 drives the actuator pins 114 in a similar manner as described in FIGS. 2-3B. As illustrated, the arm-engaging end 128 (e.g., the radial portion 130) of the actuator pin 114 provides a position of engagement that continuously engages the straight edge 133 of the pivotable arms 124 independent of the state of the actuator 18. As illustrated in FIG. 4A, when the actuator 18 causes the actuator pin 114 to move to a deployed position, the plunger portion 127 contacts a first portion 137 of the tapered edges 132 as the radial portion 130 extending from the actuator pin 114 is moved to contact a first portion 136 of the straight edge 133 to pivotably-move the pivotable arms 124 about a pivot 134 to move the pivotable arms 124 and undercut-forming edge 115 to an undercut molding position.

Conversely, as illustrated in FIG. 4B, when the actuator 18 causes the actuator pin 114 to move to a retracted position, the plunger portion 127 is moved proximate a second portion 139 of the tapered edges 132 as the radial portion 130 extending from the actuator pin 114 is moved to contact a second portion 138 of the straight edge 133. The contact between radial portion 130 and nib 140 causes the pivotable arms 124 to pivot about the pivot 134 into an undercut de-molding position. In addition, the pivotable arms 124 may be pivotally urged in a similar manner as described above in FIG. 3B to the undercut de-molding position by way of a bias means (e.g. a spring or the like attached to pivotable arms 124), or, it may be accomplished by separating mold halves of a mold tool away from an article that is molded about the undercut forming surfaces 25 thereby causing the frictional engagement between the undercut forming surfaces 25 of the pivotable arms 124 and the molded article 700 to pivot the pivotable arms 124 into a retracted position.

When in the undercut de-molding position, the plunger portion 127 may or may not contact the tapered edge 132 of the pivotable arms 124 at the second portion 139. If desired, the engagement of the projection/nib 140 with the radial portion 130 may positively lock and prevent the pivotable arms 124 from rotating about the pivot 134 when the pivotable arms 124 are moved to the de-molding position. Accordingly, the one or more projection/nib 140 extending from the pivotable arms 124 prevents a free-pivoting movement of the pivotable arms 124 about the pivot 134 once the actuator pin 114 is moved to the retracted position. Additionally, the engagement of the one or more radial portions 140 extending from the pivotable arms 124 and the radial portion 130 extending from the actuator pin 114 prevents the actuator pin 114 from being withdrawn from the undercut molding device 112.

Figure 5:
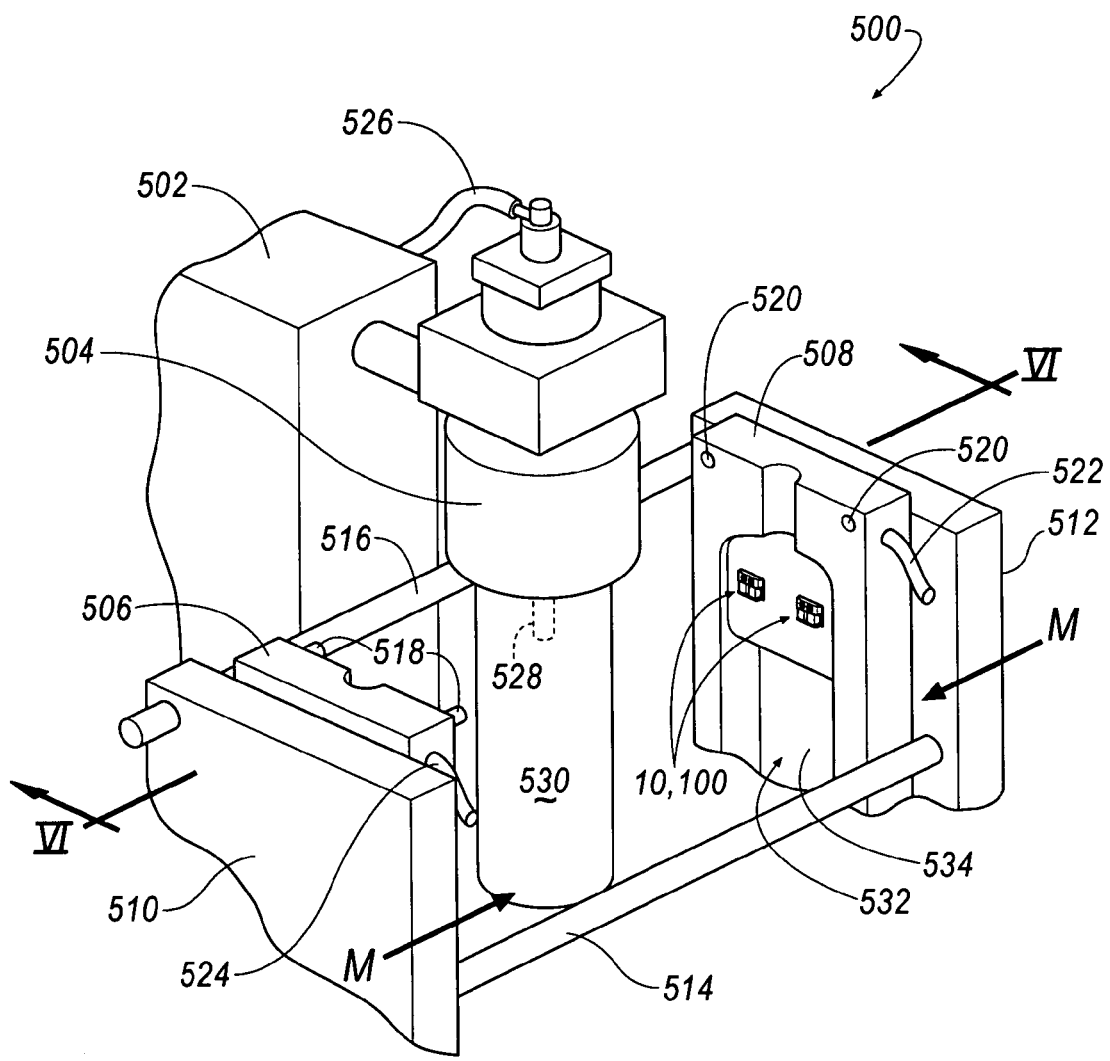
FIG. 5 is a perspective view of a blow-molding tool including an apparatus for forming an undercut according to an embodiment.
Figure 6:
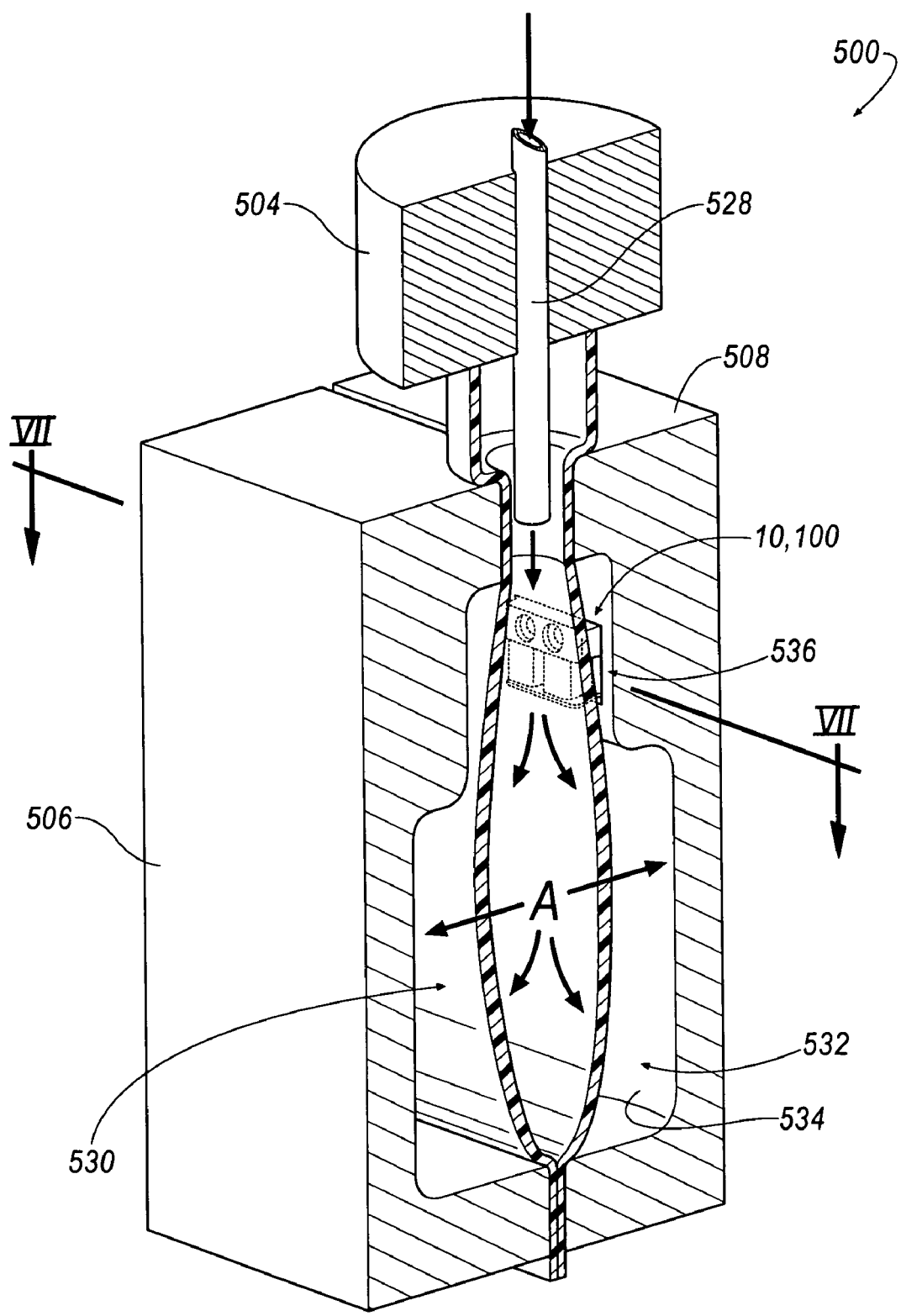
FIG. 6 is a perspective, cross-sectional view of the blow-molding tool including an apparatus for forming an undercut according to line VI-VI of FIG. 5.

Referring to FIGS. 5 and 6, according to an embodiment, a blow molding tool 500 including the apparatus 10, 100 is shown according to an embodiment. The blow molding tool 500 includes an extruder 502 for heating plastic material to be used in forming a blow molded plastic article, such as, for example, a fuel tank 700 having an undercut 702 (FIGS. 7C, 7D, 8 and 10-11).

The extruder 502 delivers the plastic material to a die head 504 having a screw parison adjustment positioned thereon. Mold halves 506, 508 are attached to platens 510, 512, which are slidably-connected together by support rods 514, 516. Guide pins 518 on mold half 506 extend into depressions 520 in mold half 508 for ensuring that when the mold halves 506 and 508 come together, they will be in a proper relative relationship. Coolant lines 522 and 524 extend into the mold halves 506, 508 for carrying away heat from the molding tool 500 and (thereby solidifying) the molded plastic articled 700 so that it will retain its shape after it is ejected from the mold tool 500. An air line 526 is attached to the molding tool 500 for blowing air down to and through an air pin 528, which extends inside of a parison of molten plastic 530.

Figure 7A:
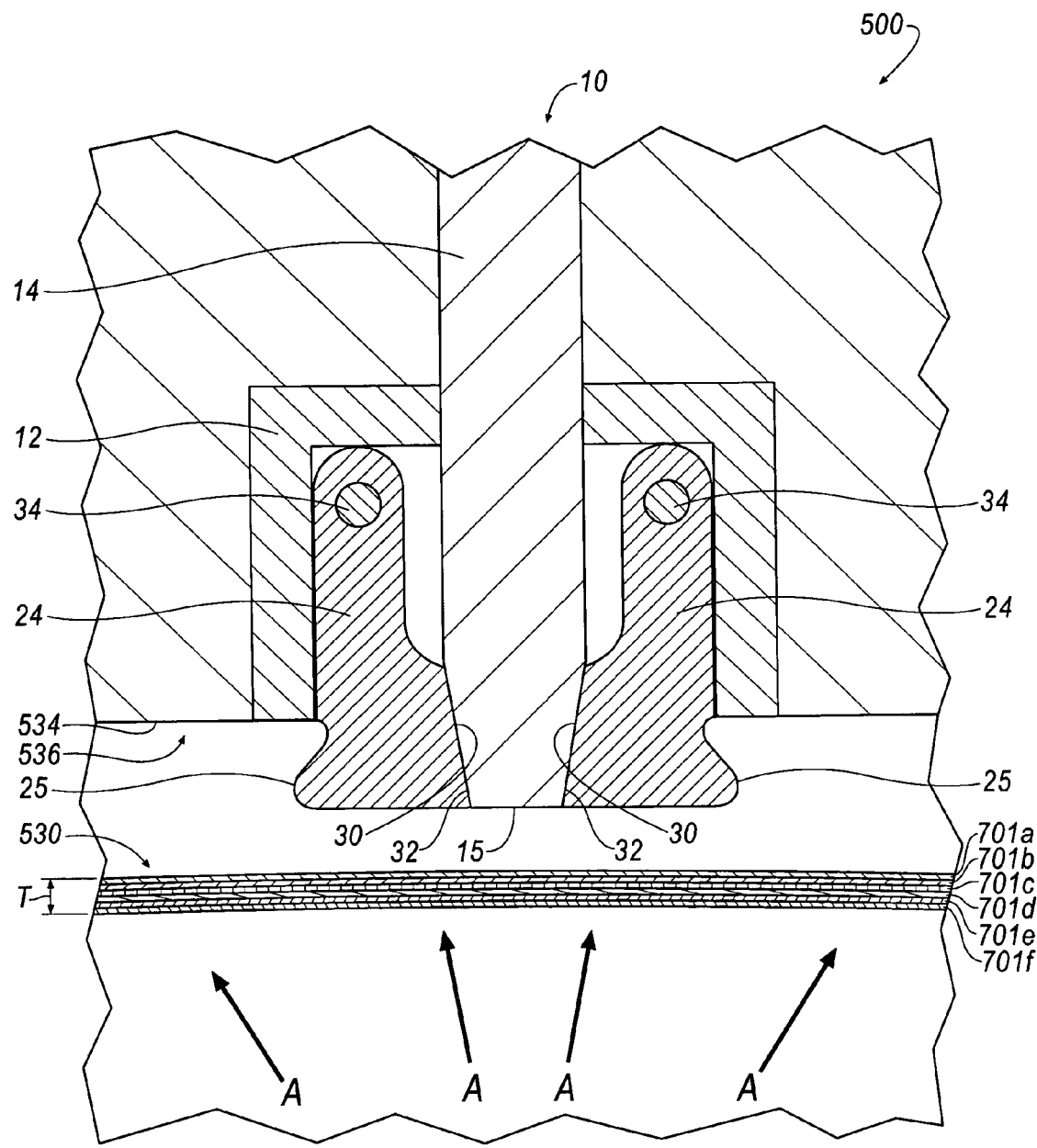
FIGS. 7A-7D are staged cross-sectional views of a parison of material being molded into a plastic article by the blow-molding tool according to line VII-VII of FIG. 6 according to an embodiment.

In operation, the blow molding tool 500 receives plastic in granulated form entering the extruder 502 via a hopper (not shown). The plastic material becomes a molten resin around a heated screw (not shown) that pushes the molten resin into an accumulator (not shown), ram (not shown), and into the die head 504 through a chamber 534 and passageway to form the parison of molten plastic 530. Referring also to FIG. 7A, if desired, the parison of molten plastic 530 includes a thickness, T, that may be formed in a manner to include any desirable number of layers, such as, for example, six-layers 701a-701f including for example, High Density Polyethylene (HDPE) layer, an Ethylene Vinyl Alcohol (EVOH) layer, two ADMER® Linear Low Density Polyethylene (LLDPE)-based adhesive layers, a HDPE layer mixed with carbon black, and finally a regrind layer that consists of all layers of the tanks that were ground through a grinder.

As seen in FIG. 5, the parison of molten material 530 is positioned to hang between the two mold halves 506, 508, which are clamped onto platens 510, 512. When the platens 510, 512 close together in the direction of arrows, M, to position the mold tool 500 as shown in FIG. 6, the parison of molten material 530 will be pinched on the top and bottom. The mold halves 506, 508 have a relief area to allow for the presence of excess material. The rest of the parison of molten material 530 is encapsulated in a mold cavity 532.

Figure 7B:
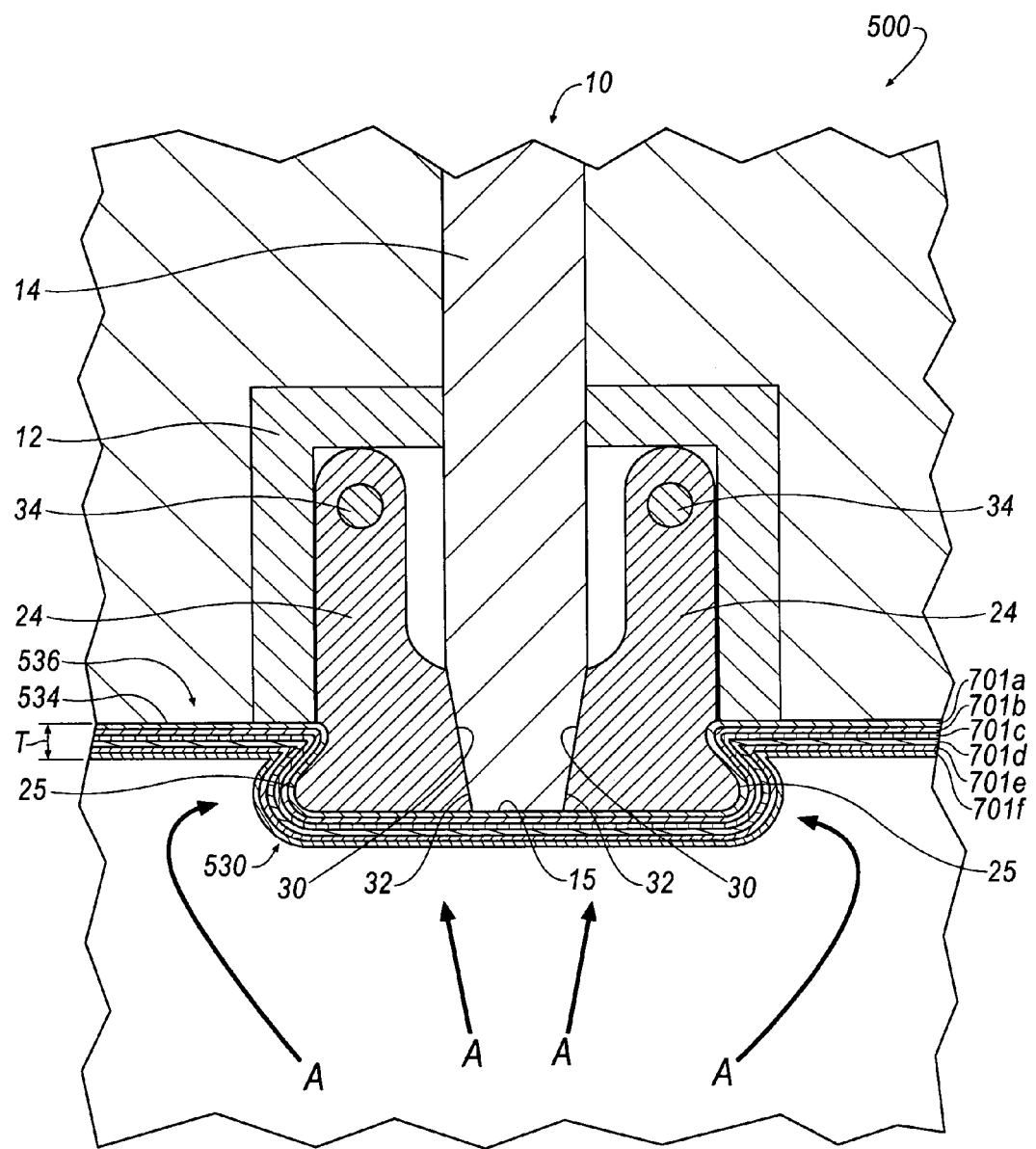

Referring to FIGS. 6-7B, the parison of molten material 530 is inflated with air from the air pin 528 which causes side portions of the parison to expand in the direction of the arrows, A, against the walls 534 of the cavity 532 similar to that of blowing up a balloon. One or more undercut molding devices 12 are fixed proximate a surface 536 of the cavity 532. Accordingly, when the undercut forming surfaces 25 are moved to an undercut molding position, the parison of molten material 530 may then be blown against the walls 534, undercut forming edge 15, and undercut forming surfaces 25. As such, the undercut forming edge 15 and undercut forming surfaces 25 proximate the surface 536 of the cavity 532 are utilized to form the undercut 702/dovetail contour on a surface 704 of the fuel tank 700.

Figure 7C:
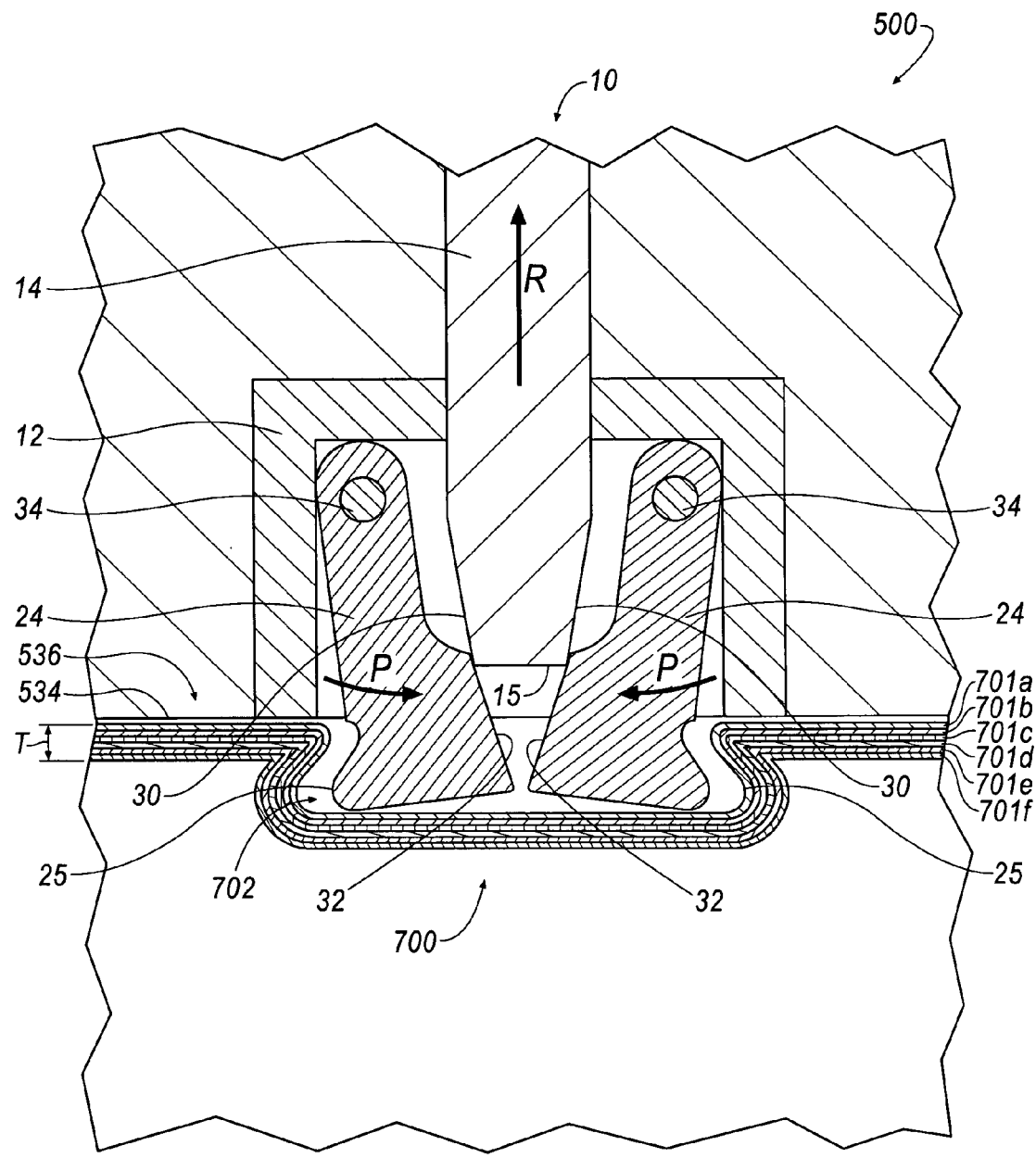
Figure 7D:
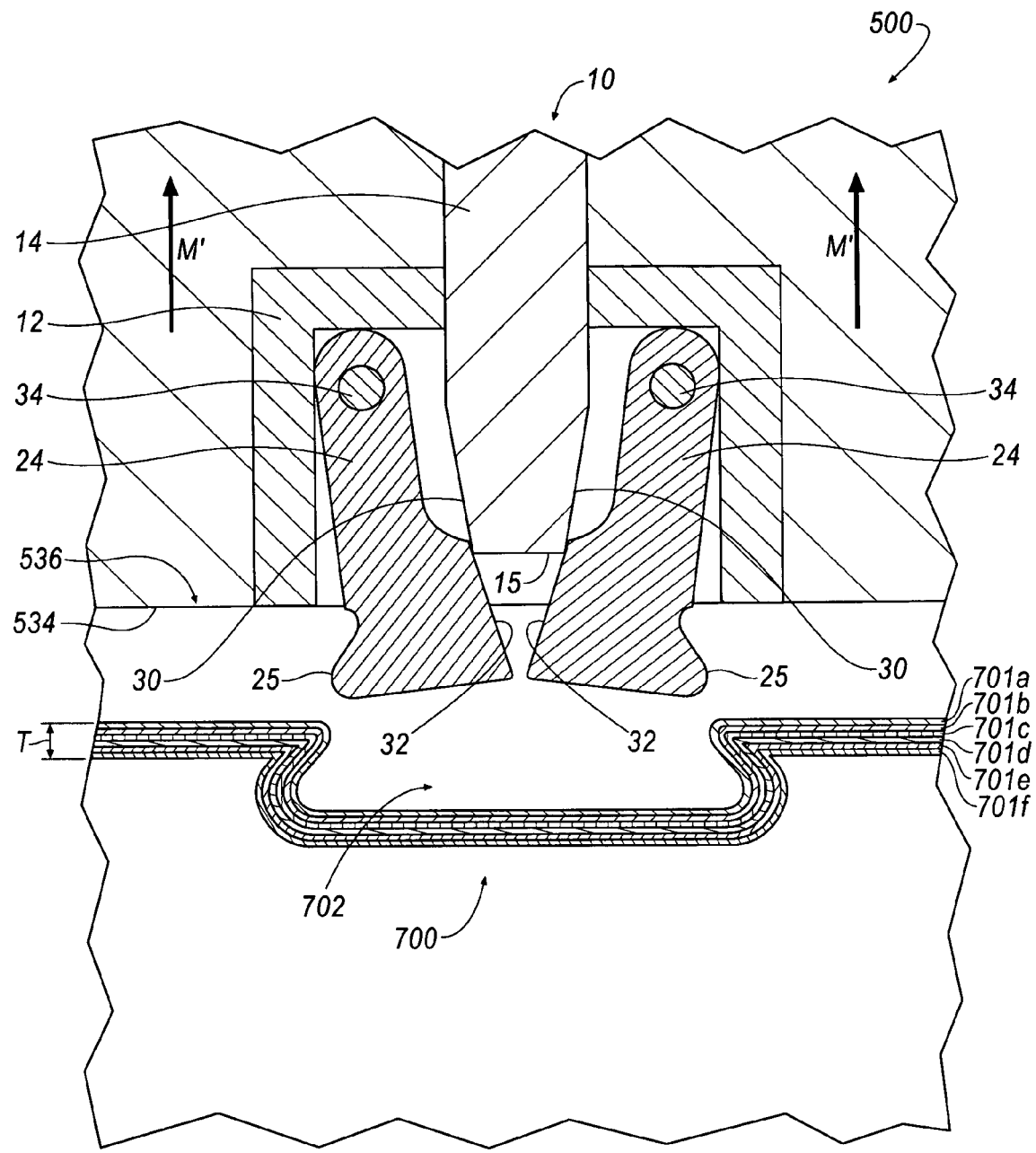

Then, as shown in FIGS. 7C-7D, the molding tool 500 is internally cooled and the actuator pin 14 is retracted in the direction of the arrow, R. The undercut forming pivotable arms 24 may be pivotally urged in the direction of the arrow, P, in order to permit the apparatus 10 to move from the undercut molding position (i.e., as seen in FIGS. 7A and 7B) to the undercut de-molding position (i.e., as seen in FIG. 7C).

This urging can be effected by way of a bias means (e.g. a spring or the like attached to pivotable arms 24) or it may be accomplished by separating mold halves 506, 508 away from article 700 thereby causing the frictional engagement between the undercut surfaces 25 of pivot arms 24 and the molded article 700 to pivot P the pivot arms 24 into a retracted position. Then, as seen in FIG. 7D, the mold halves 506, 508 are moved away from the molded article 700 in the direction of the arrow, M', which is opposite the direction of the arrow, M, with the apparatus 10 already positioned in the de-molding position according to FIG. 7C.

Accordingly, when the one or more undercut forming surfaces 25 is/are moved to the undercut de-molding position (FIG. 7C), the molded fuel tank 700 may be easily removed from the molding tool 500 without damaging the apparatus 10, 100 or the undercut 702 formed on the surface 704 of the fuel tank 700 by the apparatus 10, 100. It will be appreciated that although the one or more undercut forming surfaces 25 are fixed in a location 536 proximate the walls/surface 534 of the cavity 532, the one or more undercut molding devices 12 may be moved relative the mold tool 500 before, during, or after the molding of the fuel tank 700. As such, it will be appreciated that the mold halves 506, 508 of the illustrated embodiment do not effect movement of the one or more undercut forming surfaces 25, but rather, movement of the actuator pin 14, 114 effects movement of the one or more undercut forming surfaces 25. As such, when molding of the fuel tank 700 is completed, it will be appreciated that the actuator pin 14, 114 may first be moved to enable the one or more undercut forming surfaces 25 be urged to the de-molding position, then, the mold halves 506, 508 may be subsequently moved from the closed position (i.e., as shown in FIG. 6) to an open position (i.e., as shown in FIG. 5).

Figure 9:
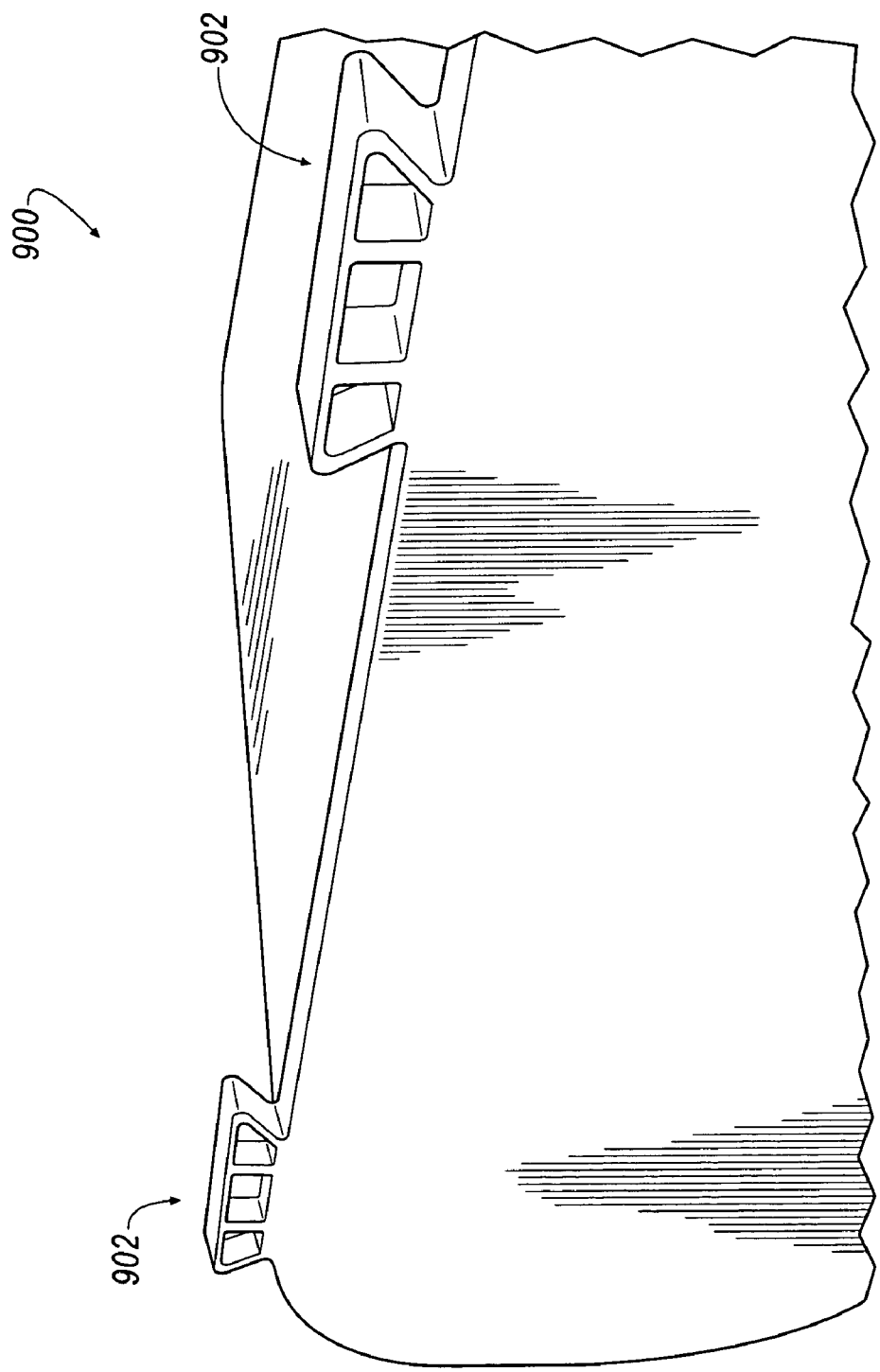
FIG. 9 is a partial perspective view of an article including a dovetail member according to an embodiment.
Figure 10:
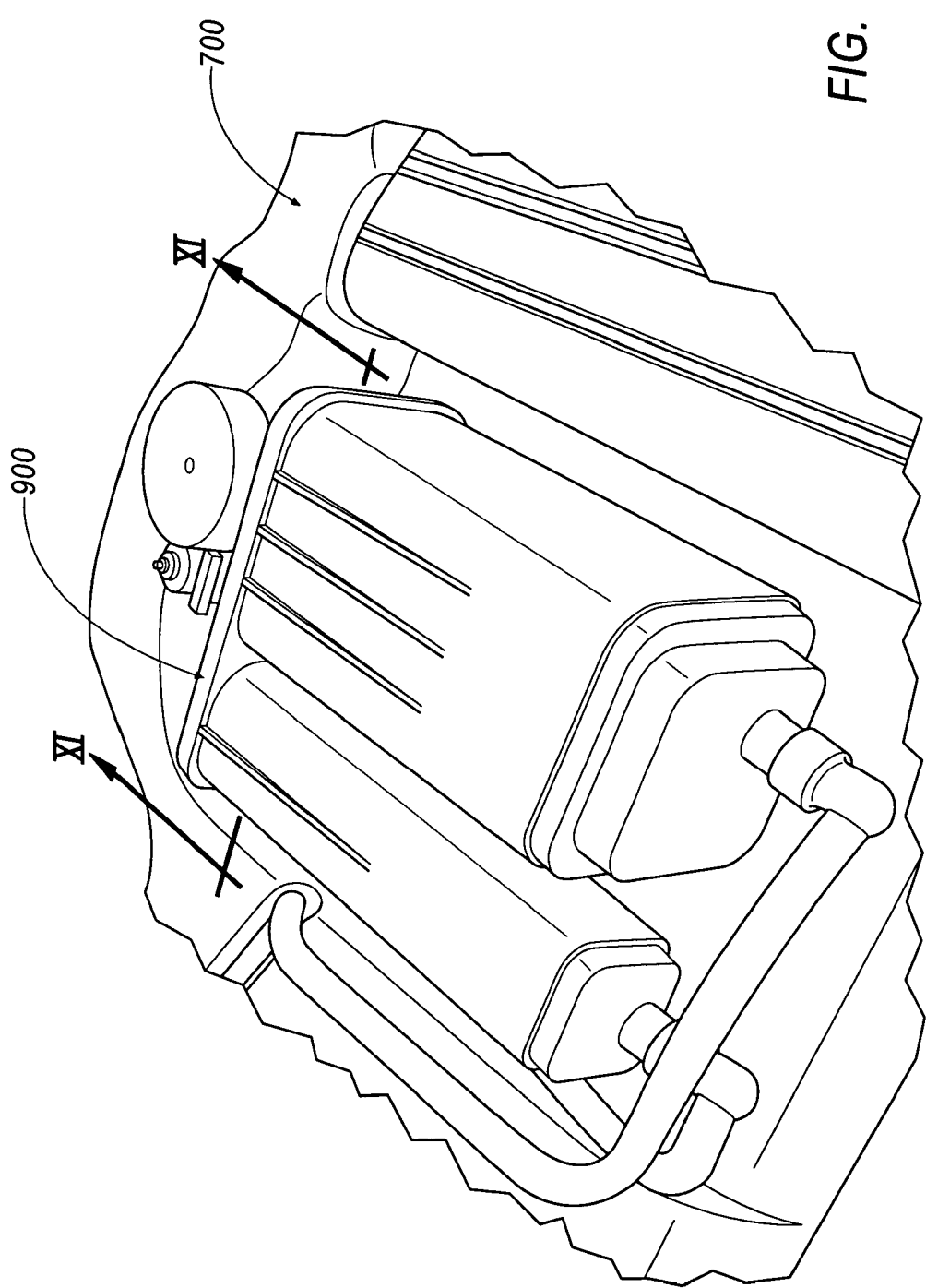
FIG. 10 is a partial perspective view of an assembly including the molded article of FIG. 8 joined to the article of FIG. 9 by way of the undercut and dovetail member according to an embodiment.
Figure 11:
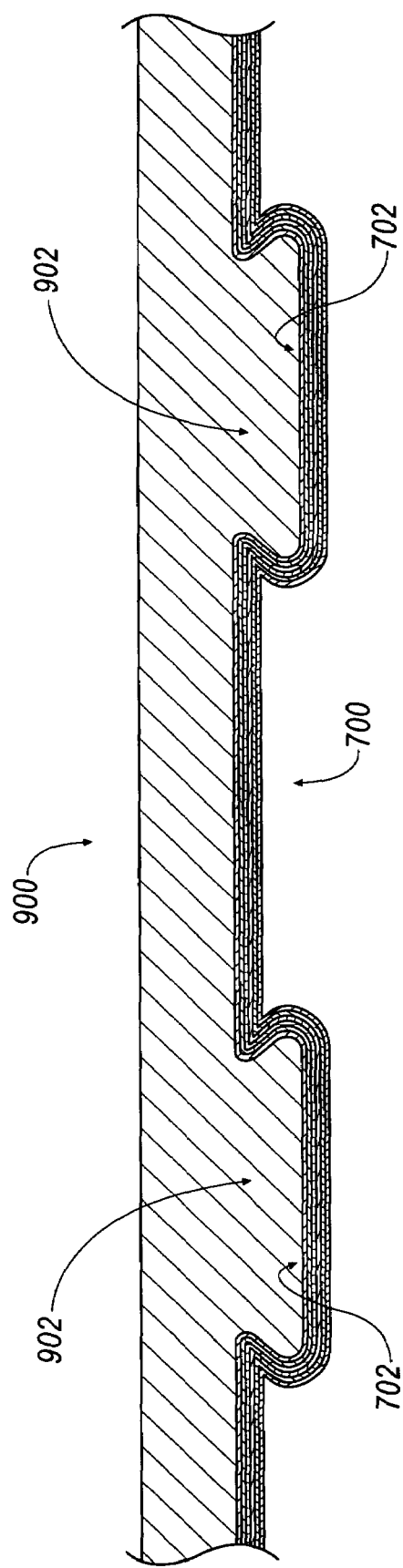
FIG. 11 is a cross-sectional view of the assembly according to line XI-XI of FIG. 10.
Figure 12A:
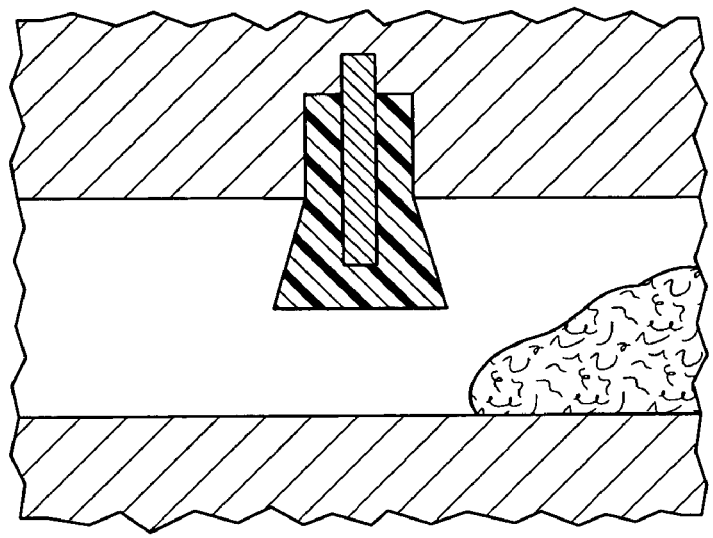
FIGS. 12A-12D are cross-sectional views of a conventional apparatus and method for forming an undercut in a mold tool.
Figure 12B:
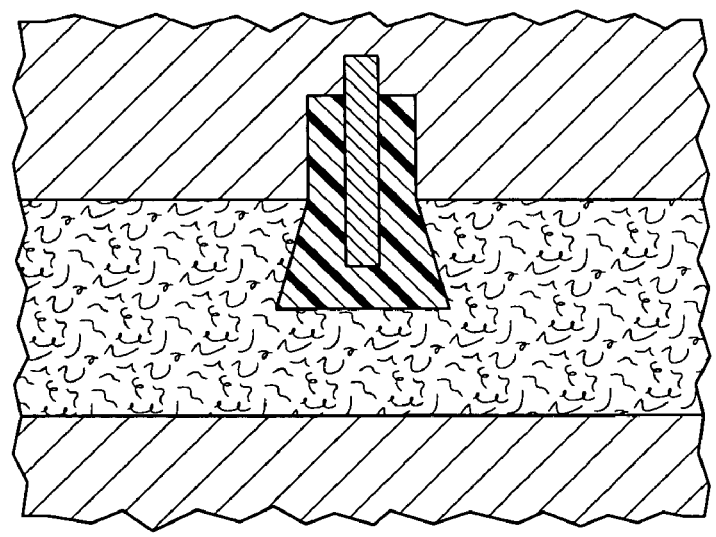
Figure 12C:
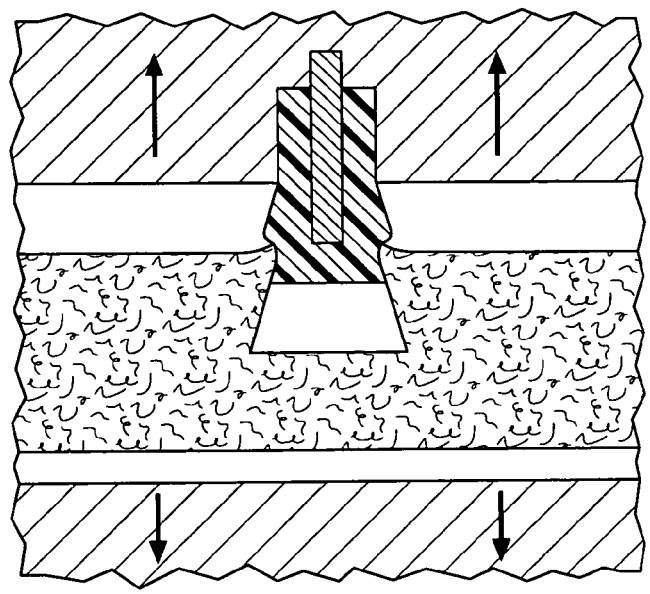
Figure 12D:
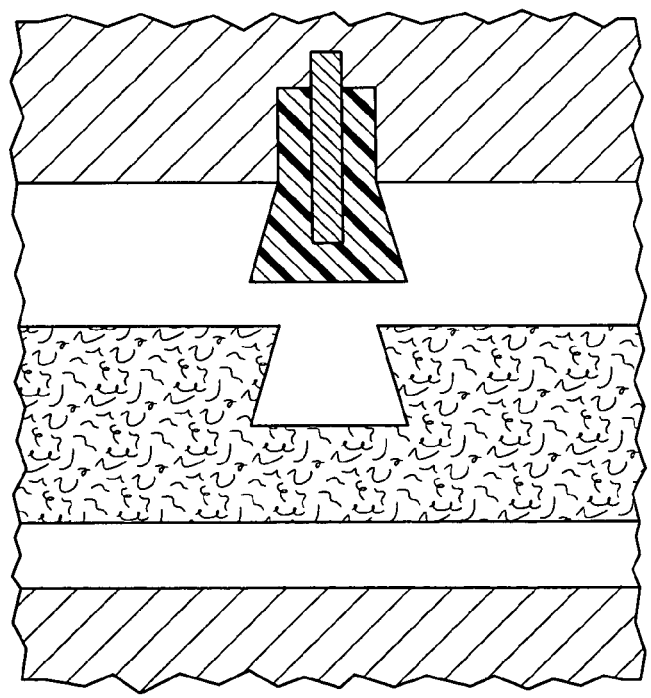

Referring to FIG. 9, an apparatus 900 including a dovetail 902 extending from a surface 904 of the apparatus 900 is shown according to an embodiment. According to an embodiment, the apparatus 900 is a canister for retaining a fuel system component. Thus, as seen in FIGS. 10-11, the dovetail 902 may be easily inserted into the undercut 702 so as to mechanically-couple the fuel tank 700 and fuel system component 900 to provide an undercut-coupled fuel tank assembly 1000.

Typically, conventional fuel system component are attached to fuel tanks vis-a-vis a bracket that is welded to the fuel tank to form a conventional fuel tank assembly. Aside from the increased cost of including a bracket to form the conventional fuel tank assembly, manufacturing time of the conventional fuel tank assembly is also increased in view of the mechanical coupling of the novel fuel tank assembly 1000 vis-a-vis the dovetail 902 and undercut 702. If desired, the undercut 702 formed on the surface 704 of the fuel tank 700 may be designed to include a ramping wedge (i.e., a cross-sectional passage 706 (FIG. 8) of the undercut 702 decreases along the length, L, of the undercut 702 as measured from a first end 708 of the undercut 702 toward a second end 710 of the undercut 702). Further, as seen in FIG. 8, the first end 708 forms an entrance opening 712. Further, as seen in FIG. 8, the undercut 702 also includes a lateral surface 714, a pair of opposing side surfaces 716, 718 extending along the length, L, of the undercut 702 from the first end 708 to the second end 710. In an embodiment, the pair of opposing side surfaces 716, 718 are connected by the lateral surface 714. In an embodiment, the pair of opposing side surfaces 716, 718 form a top opening 720 extending along the length, L, of the undercut 702 from the first end 708 to the second end 710. In an embodiment, the pair of opposing side surfaces 716, 718 and lateral surface 714 form the cross-sectional passage 706. In an embodiment, the cross-sectional passage 706 is accessible from the entrance opening 712 and the top opening 720. In an embodiment, the decrease of the cross-sectional passage 706 along the length, L, of the undercut 702 from the first end 708 to the second end 710 provides the cross-sectional passage 706 with a decrease in dimension along the length, L, of the undercut 702 from the first end 708 to the second end 710. Accordingly, as the dovetail 902 is passed into the undercut 702, the dovetail 902 may be become wedged and frictionally-retained within the undercut 702.

Thus, apparatus 10, 100 overcomes difficulties associated with the molding of an undercut 702 in a plastic article, such as, for example a fuel tank 700. When the actuator pin 14, 114 is moved, the pivotable arms 24, 124 of the undercut molding device 12, 112 may expand or collapse inwardly upon itself. When the pivotable arms 24, 124 retract inwardly, the apparatus 10, 100 provides a clearance proximate the undercut 702 so as to reduce contact between and the likelihood that the undercut 702 or apparatus 10, 100/molding tool 500 is damaged during the de-molding of the plastic article 700.

Additionally, the actuator pin 14, 114 prevents any movement of the pivotable arms 24, 124 during the molding of the undercut 702; accordingly, a parison of molten material, or, alternatively, an injected flow of air in a blow molding operation, or, an injected amount of molten material will not collapse the pivotable arms 24, 124 during the molding of the undercut 702. Additionally, the molded-in undercut 702 of a fuel tank 700 eliminates the need of a bracket while also reducing the manufacturing time needed to weld the bracket to the fuel tank of a conventional fuel tank assembly.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A molded article, comprising:
 a wall of a fuel tank having an inner surface and an outer surface, wherein the outer surface includes-an undercut, wherein the undercut includes
  a first end and a second end, wherein the first end forms an entrance opening,
  a lateral surface,
  a pair of opposing side surfaces extending along a length of the undercut from the first end to the second end and wherein the pair of opposing side surfaces are connected by the lateral surface, wherein the pair of opposing side surfaces form
   a top opening extending along the length of the undercut from the first end to the second end,
 wherein the pair of opposing side surfaces and lateral surface form
  a cross-sectional passage accessible from the entrance opening and the top opening, wherein the cross-sectional passage decreases along the length of the undercut from the first end to the second end to provide the cross-sectional passage with a decrease in dimension along the length of the undercut from the first end to the second end.

2. The molded article according to claim 1, wherein the wall of the fuel tank includes a thickness having a plurality of layers.

3. The molded article according to claim 2, wherein the plurality of layers includes six layers having a first layer including high density polyethylene, a second layer including Ethylene Vinyl Alcohol (EVOH), a third and a fourth layer including Linear Low Density Polyethylene (LLDPE)-based adhesive, a fifth layer including high density polyethylene mixed with carbon black, and a sixth layer including a regrind material.

4. The molded article according to claim 1, wherein the cross-sectional passage forms a dovetail contour, wherein the dovetail contour provides means for permitting insertion of a dovetail portion extending from a surface of an apparatus into the cross-sectional passage for connecting the apparatus to the outer surface of the fuel tank.

5. The molded article according to claim 4, wherein the decrease in dimension of the cross-sectional passage along the length of the undercut from the first end to the second end forms the undercut to include a ramping wedge, wherein the ramping wedge provides means for wedging the dovetail portion of the apparatus adjacent the lateral surface and the pair of opposing side surfaces of the undercut as the dovetail portion is advanced through the cross-sectional passage of the undercut and toward the second end from the entrance opening formed by the first end until a cross-section of the dovetail portion is approximately equal to but greater than the cross-sectional passage, wherein the ramping wedge provides means for frictionally-retaining the apparatus to the outer surface of the fuel tank, wherein the apparatus is a fuel system component canister.

* * * * *